(12) United States Patent
Gonnsen (10) Patent No.: US 10,569,796 B2
(45) Date of Patent: Feb. 25, 2020

(54) TROLLEY HANDLING DEVICE, TROLLEY CABINET, TRANSPORTATION MEANS, AND METHOD OF GUIDING A TROLLEY

(71) Applicant: Airbus Operations GmbH, Hamburg (DE)

(72) Inventor: Johannes Gonnsen, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 342 days.

(21) Appl. No.: 15/604,729

(22) Filed: May 25, 2017

(65) Prior Publication Data

US 2017/0341670 A1 Nov. 30, 2017

(30) Foreign Application Priority Data

May 25, 2016 (EP) .................................... 16171429

(51) Int. Cl.
*B62B 5/00* (2006.01)
*B64D 11/04* (2006.01)
*B64D 11/00* (2006.01)

(52) U.S. Cl.
CPC ........ *B62B 5/0083* (2013.01); *B64D 11/0007* (2013.01); *B64D 11/04* (2013.01); *B62B 2202/67* (2013.01)

(58) Field of Classification Search
CPC ........ B62B 5/00; B62B 5/0083; B62B 5/0086
See application file for complete search history.

(56) References Cited

U.S. PATENT DOCUMENTS

| 4,660,787 A | 4/1987 | Sprenger et al. |
| 5,465,660 A * | 11/1995 | Conti ................... B30B 9/3003 100/100 |
| 5,496,000 A | 3/1996 | Mueller |
| 2008/0001031 A1 | 1/2008 | Doebertin et al. |
| 2013/0206905 A1 | 8/2013 | Savian |

(Continued)

FOREIGN PATENT DOCUMENTS

| DE | 4302706 | 8/1994 |
| DE | 10204892 | 8/2003 |

(Continued)

OTHER PUBLICATIONS

European Search Report, dated Nov. 22, 2016, priority document.

*Primary Examiner* — Robert J McCarry, Jr.
(74) *Attorney, Agent, or Firm* — Greer, Burns & Crain, Ltd.

(57) ABSTRACT

A trolley handling device for guiding a trolley into and out of a trolley stowage, comprising a trolley holder adapted to interact with and secure the trolley against displacement relative to the trolley holder in at least a first direction, and a guiding device comprising a first guiding element attached to the trolley holder and a second guiding element adapted to be provided on a structural part arranged near the stowage. The first and second guiding elements are configured to engage with each other and to guide the trolley between a first position, in which the trolley is essentially arranged inside of the stowage, and a second position, in which the trolley is at least partially arranged outside the stowage. The trolley, in its second position, is arranged offset relative to its first position in the first direction and in a second direction perpendicular to the first direction.

17 Claims, 6 Drawing Sheets

(56) References Cited

U.S. PATENT DOCUMENTS

| | | | |
|---|---|---|---|
| 2013/0259612 A1 | 10/2013 | Guering | |
| 2013/0299280 A1 | 11/2013 | Friedrich | |
| 2014/0166806 A1 | 6/2014 | Durnad | |
| 2015/0069179 A1 | 3/2015 | Ehlers et al. | |
| 2016/0167784 A1 | 6/2016 | Schliwa | |

FOREIGN PATENT DOCUMENTS

| | | |
|---|---|---|
| DE | 102006023047 | 11/2007 |
| DE | 102011052497 | 4/2012 |
| EP | 0668149 | 8/1995 |
| EP | 2743182 | 6/2014 |
| EP | 2848531 | 3/2015 |
| WO | 2013123060 | 8/2013 |
| WO | 2015014850 | 2/2015 |

\* cited by examiner

TROLLEY HANDLING DEVICE, TROLLEY CABINET, TRANSPORTATION MEANS, AND METHOD OF GUIDING A TROLLEY

CROSS-REFERENCES TO RELATED APPLICATIONS

This application claims the benefit of the European patent application No. 16 171 429.0 filed on May 25, 2016, the entire disclosures of which are incorporated herein by way of reference.

BACKGROUND OF THE INVENTION

The present invention concerns a trolley handling device for guiding at least one trolley into and out of a trolley stowage, a trolley cabinet and a transportation means or transportation vehicle, each having such a trolley handling device, as well as a method of guiding a trolley into and out of a trolley stowage with such a trolley handling device.

In means or vehicles of transportation, such as modern aircraft or trains, trolleys are employed for carrying supplies, e.g., meals, medical equipment or products for sale for the passengers or other items required by the staff on board the transportation means. In aircraft, for example, these trolleys can be stowed in trolley cabinets of aircraft galleys which are, inter alia, located next to the aircraft doors and adjacent to a passageway of the aircraft and an aisle in an entrance area of the aircraft. Such trolley cabinets are, for example, described in documents EP 2 848 531 A1, DE 10 2006 023 047 A1 and US 2008/0001031 A1. Conventional trolley cabinets comprise a plurality of partition walls, wherein, in a lower portion of the trolley cabinet, trolleys can be stowed next to each other by rolling them on the floor of a compartment of the transportation means into the stowage and securing the trolley by a conventional latch against escaping from the trolley stowage, particularly, during taxi, take-off, landing or in the event of turbulences during the flight.

Figure 1:
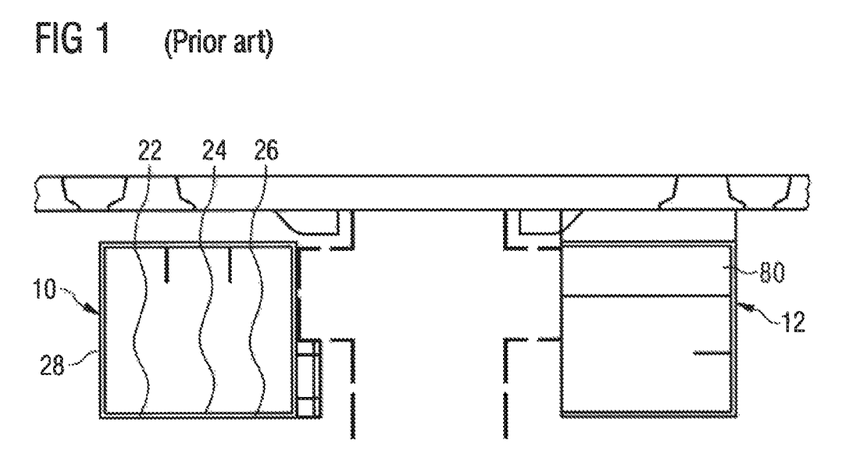
FIG. 1 shows a conventional aircraft galley.

A further conventional aircraft galley is shown in FIG. 1. The aircraft galley comprises two aircraft cabinets 10, 12 arranged next to and on opposite sides of an aircraft door. In cabinet 10, three equally sized trolleys are stowed behind doors 22, 24, 26 in stowages delimited by lateral and internal cabinet walls. In order to stow away the central one of the three trolleys, door 24 is opened towards the aisle or passage way of the aircraft, and the central trolley is rolled into the open trolley stowage. To secure the trolley against rolling back out of the trolley stowage and into the aisle of the aircraft, a latch (not shown) adapted for holding the trolley is closed, whereafter also the door 24 is closed. Thus, when the three trolleys are stored in the stowage spaces of the cabinet 10, the lateral and internal walls of the trolley cabinet, respectively, secure the trolleys against displacement in the X-direction of the aircraft (i.e., the longitudinal direction of the aircraft), and the latches respectively associated with each of the trolleys as well as the sidewall of the aircraft prevent the trolleys from escaping from the trolley cabinet in the Y-direction (i.e., transversal direction of the aircraft). In the trolley cabinet 12, further trolleys are stowed perpendicularly relative to the aforementioned three trolleys and accessed over an entrance area adjacent to the aircraft door. This cabinet comprises an extra space 80 which is typically not used for trolleys.

SUMMARY OF THE INVENTION

The present invention is directed to an object of providing a trolley handling device that allows guiding a trolley into and out of spaces of a trolley stowage that are conventionally not used for stowing trolleys in a well-defined and user-friendly manner. Furthermore, the invention is directed to an object of providing a trolley cabinet as well as a transportation means, each with a trolley handling device of the aforementioned kind, and a method of guiding a trolley into and out of a trolley stowage in this manner.

A trolley handling device for guiding a trolley into and out of a trolley stowage comprises a trolley holder adapted to interact with the trolley and secure the trolley against displacement relative to the trolley holder in at least a first direction. To keep the trolley from being displaced in this way in reaction to an external force acting upon the trolley, the trolley holder may have an essentially U-shaped cross-section in a plane that is perpendicular to the first direction and a second direction that is perpendicular to the first direction. In this case, the two parallel limbs of the trolley holder opposing each other advantageously extend perpendicularly to the first direction, and are spaced apart by (slightly) more than the width of the trolley such to receive the trolley between the parallel limbs.

Moreover, the trolley handling device comprises a guiding device with a first guiding element attached to the trolley holder and a second guiding element adapted to be provided on a structural part arranged in the vicinity of the trolley stowage. Preferably, the first direction is parallel to a front face of the trolley by which the trolley can be loaded with goods to be carried. The first guiding element may be attached to the trolley holder and the second guiding element may be attachable to the structural part, e.g., by one or more rivets, screws or bolts, or by an adhesive. In an alternative embodiment, the second guiding element may be formed in the structural part. For example, the second guiding element may be a groove formed in the structural part. The structural part on which the second guiding element may be provided may be at least one of a part of a trolley cabinet, in particular a delimiting wall of the trolley cabinet, e.g., a desk thereof. Alternatively, the structural part may be a floor of a transportation means (such as an aircraft). Furthermore, the structural part may be an intermediate support structure attached to one of the previously named types of structural parts.

Since the second guiding element is adapted to be provided on the structural part, the trolley handling device can be distributed separately from the trolley cabinet, and the components of the trolley handling device can be retrofitted to trolley cabinets that have already been produced. Particularly, such trolley handling device is universal and can be attached to and detached from trolley cabinets already installed in the transportation means.

The first and second guiding elements are configured to engage with each other. In particular, the first and second guiding elements may be adapted to engage with each other at least when the trolley is in one of a first position, in which the trolley is essentially arranged inside of the trolley stowage, and a second position in which the trolley is at least partially arranged outside of the stowage, or at all times once mounted to the structural part. This configuration provides the advantage that the guiding elements interact to stabilize the trolley against external forces acting upon the trolley when it is held by the trolley holder. Alternatively, other modes of interaction between the first and second guiding elements are conceivable, as long as the first and second guiding elements are designed so as to guide the trolley between the first position and the second position.

In an embodiment, the trolley holder has a back wall configured for limiting the movement of the trolley in the second direction. The back wall preferably extends between and substantially perpendicularly to the parallel limbs. The back wall may be arranged at an end of the trolley holder in the second direction that is the furthest-most inside the trolley stowage when the trolley is in its first position inside the trolley stowage. Moreover, one or more latches may be arranged on the trolley holder, which latch/es is/are adapted to secure the trolley to the trolley holder. In particular, the latch/es may be attached to the trolley holder such as to be displaced together with the trolley holder. Each one of the latches may be positioned at a front end of the trolley holder opposing the back wall, thus, at an end of the trolley holder that is distal relative to the trolley stowage when the trolley holder is in the second position. Preferably, the trolley is fixable to the trolley holder between the back wall and the latch/es.

Moreover, it is conceivable that a plurality of trolleys, e.g., two half-size trolleys, is secured by one trolley holder. In this case, a plurality of latches may be arranged on the trolley holder to provide the above described fixation of the trolley. For example, a first trolley may be secured between the back wall and a first latch arranged centrally in the longitudinal direction of the trolley holder between its limbs and the second trolley may be secured between the first latch and a second latch arranged at the front end of the trolley holder.

Essentially arranged inside means, in the present context, a situation in which the trolley is deposited in the trolley stowage when it is not in use, thus, when the trolley is stowed away. For example, in the first position, the trolley may be positioned such that at least 90% of its footprint overlaps with the footprint of the cavity of the trolley stowage. The trolley may project from the trolley stowage by up to about 10 cm. Alternatively, when the trolley is essentially arranged inside of the trolley stowage, the trolley may be entirely arranged inside of the trolley stowage, i.e., such that the trolley does not project beyond a front face of the trolley cabinet. In particular, the footprint of the trolley may completely overlap with the footprint of the trolley stowage in this case.

When the trolley is in its second position, it is arranged offset relative to its first position in the first direction and in the second direction perpendicular to the first direction. The first and second directions may both be oriented horizontally, thus, form a horizontal plane. The horizontal plane may be parallel to a plane on which the trolley cabinet having the trolley stowage stands and/or parallel to a desk of the trolley cabinet. Thus, in order to move the trolley out of the trolley stowage, the user can simply pull the trolley in the second direction, whereby the trolley is guided by the trolley holder cooperating with the guiding device to be also displaced in the first direction. Therefore, by means of the trolley handling device, the trolley can be guided out of the stowage not only perpendicularly to a front side of the stowage, but also laterally, i.e., in parallel to the front side. Hence, the trolley handling device allows for stowing the trolley more flexibly and increasing the space efficiency of transportation means. Furthermore, the trolley can be guided around any obstacles such that a clash is prevented when the trolley is moved between the first and second positions. Additionally, when the trolley holder is arranged in its second position, the top surface of the trolley holder can be used as a desk. Thus, the trolley holder essentially functions as a pull-out table for depositing goods.

Advantageously, the first and second guiding elements are designed so as to guide the trolley along a preset/predefined path extending between the first and second positions in a plane formed and defined by the first and second directions. In particular, the path may comprise a first section formed as a first arc which is preferably a circular arc having a predefined radius. The radius may be larger than a dimension of the trolley in at least one of the first and the second directions. Preferably, the radius is between 1.5 and 3 m; most preferably the radius is (about) 2 m. Alternatively, the path may be at least in sections straight/line-shaped. In this case, the path is preferably oblique to both, the first and the second directions.

In a further embodiment, the path comprises a second section formed as a second arc that is bent in the opposite direction of the first arc. For example, in a top view, the first section is curved such that the trolley is guided out of the stowage in the first direction, whereas the second section is curved such that the trolley is further guided out of the stowage opposite to the first direction. Optionally, the absolute value of the radius of the first and second arcs may be identical.

In a preferred embodiment, the first guiding element comprises a slide. Preferably, the slide has a base part formed integrally with the trolley holder. The trolley holder may be rigidly attached to the first guiding element such that a relative movement between the trolley holder and a stationary part of the first guiding element, e.g., the slide, is effectively prevented. In an alternative embodiment, the relative movement between the trolley holder and the entire first guiding element is prevented.

Moreover, the slide may comprise a plurality of rollers (i.e., roller wheels) that are rotatably mounted to the base part. The second guiding element may comprise a guiding rail that is attachable to a side of the structural part facing the trolley holder. In this case, the guiding rail is designed to receive the slide. In particular, the guiding rail may have two essentially parallel walls which may extend perpendicularly to the first and second sections. In a preferred embodiment, the guiding rail has a U-shaped cross-section. In this case, the parallel walls may be the limbs of the U-shaped guiding rail. The rollers may be arranged to rotate, thus roll, about an axis aligned perpendicular to the first and second directions. Preferably, the rollers are arranged to roll along the two walls of the guiding rail, especially when the trolley is moved between its first position and its second position. If the guiding rail has a U-shaped cross-section, the slide may comprise a complementary rail portion configured for gliding upon opposing limb surfaces of the guiding rail.

In a further embodiment, the first guiding element comprises a pivoting arm. The pivoting arm has a first end that is preferably rigidly coupled to the trolley holder. In particular, the first end may be fixed to the trolley holder such that a relative movement, e.g., a relative rotation, between the first end of the pivoting arm and the trolley holder is effectively prevented. Moreover, the pivoting arm has a second end that is attachable to the structural part. For the attachment, the second end may have an opening. In this case, the second guiding element may comprise a bolt that is suitable for suspending the pivoting arm to the structural part such that the pivoting arm is pivotable about the bolt when the bolt extends through the opening. Accordingly, the longitudinal axis of the bolt coincides with the rotational axis of the pivoting arm. Optionally, the pivoting arm may comprise a plurality of segments coupled to each other by one or more hinges.

The guiding device having the pivoting arm as the first guiding element and the bolt as the second guiding element may essentially be adapted to guide the trolley holder along the same circular arc as the previously described guiding rails having arc-shaped sections. In particular, the preset radius of the first path section having a circular arc shape may correspond to a distance between the first end of the pivoting arm and an axis about which the pivoting arm is adapted to pivot. Thus, the above-mentioned radius values of the circular arc can be realized.

In the above configurations, the trolley can simply be guided into the stowage by moving it into its second position, in which the trolley is arranged such that its footprint partly overlaps with the footprint of the stowage, such that the trolley engages with the trolley holder. Once the engagement has been reached, the trolley is essentially prevented from rotating or moving laterally with respect to the guiding rail or the pivoting arm, respectively. Then, the trolley can simply be pushed into the stowage, whereby the guiding rail/pivoting arm effectively leads the slide, the trolley holder and the trolley along the predetermined path and eventually around an obstacle. Advantageously, the user does not need to guide the trolley around the obstacle him-/herself. If the trolley handling device is, for example, employed in an aircraft, the trolley is hindered from striking the obstacle even in the presence turbulences.

Moreover, it is conceivable to combine at least one aforementioned slide and at least one pivoting arm into one first guiding element.

A trolley cabinet comprises the trolley handling device described above in details. The structural part of the trolley cabinet may be a desk of the trolley cabinet. The second guiding element may be attached to the desk.

A transportation means having a trolley handling device or a trolley cabinet as previously described in detail, may, e.g., be an aircraft or, optionally, a train. In the first case, the trolley handling device or trolley cabinet is preferably arranged in an entrance area of the aircraft passenger compartment in the proximity of the aircraft door. For example, the aircraft may comprise a trolley cabinet arranged next to an aircraft door having a slide/raft box, a hinge arm, and/or a reinforced door frame cover projecting from the aircraft door into the passenger compartment. The face of the trolley cabinet may be arranged perpendicular to the aircraft door. Then, a trolley handling device previously described may be arranged at the underside of the desk of the trolley stowage, preferably in a compartment of the trolley cabinet closest to the aircraft door. The first and second directions are in this case the above-mentioned Y-, and X-directions of the aircraft, respectively. The second position of the trolley is preferably located further towards the aisle of the aircraft, i.e., towards the interior of the passenger compartment, than the first trolley position. By this arrangement, a trolley can be safely guided into and out of the aforementioned trolley cabinet compartment around the slide/raft box, the hinge arm, and/or the reinforced door frame cover, thus, allowing to stow the trolley safely and space-efficiently.

Further, a method of guiding a trolley into and out of a trolley stowage by means of a trolley handling device described above comprises the steps of bringing the trolley into interaction with the trolley holder in order to secure the trolley against displacement relative to the trolley holder in at least the first direction, and guiding the trolley between the first position and the second position by the trolley handling device.

BRIEF DESCRIPTION OF THE DRAWINGS

Preferred embodiments of a trolley handling device and trolley cabinet are described in greater detail with reference to the attached schematic drawings in the following, wherein.

DETAILED DESCRIPTION OF THE PREFERRED EMBODIMENTS

Figure 2:
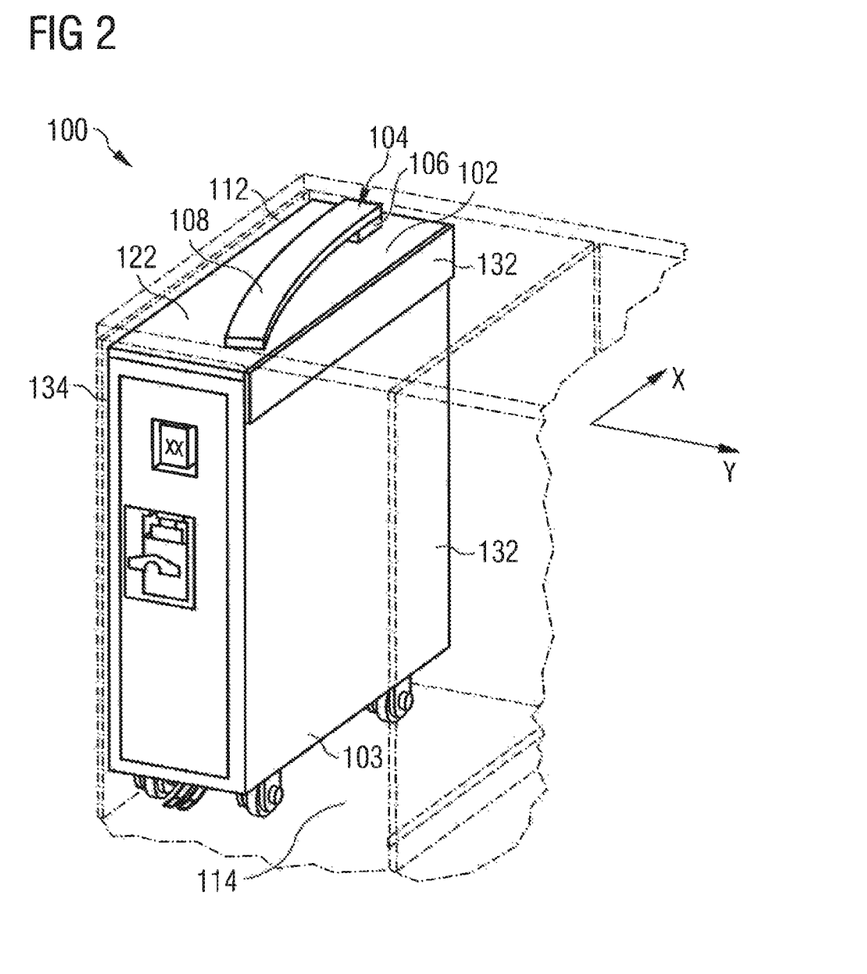
FIG. 2 shows a perspective view of a trolley handling device, wherein a trolley which interacts with the trolley handling device is arranged in its first position inside the trolley stowage.
Figure 3A:
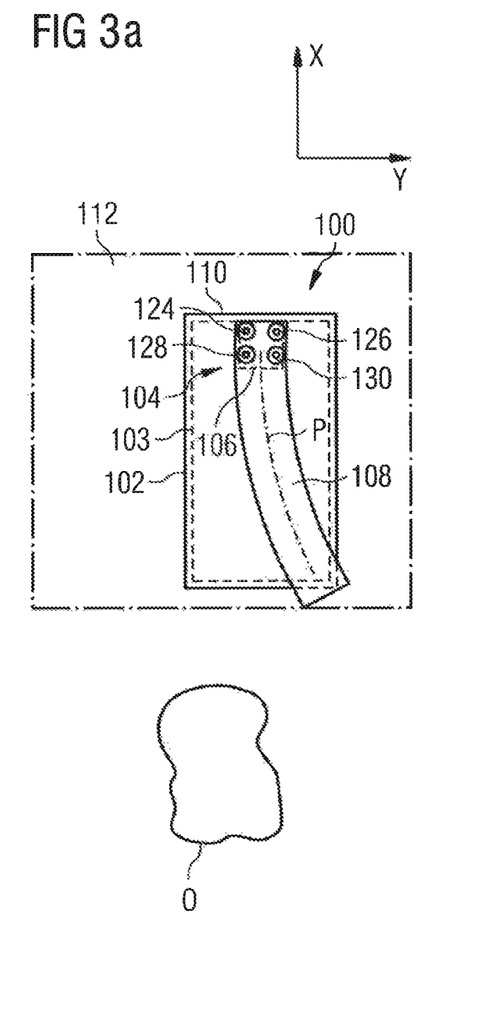
FIG. 3a shows a top view of the trolley handling device according to FIG. 2, wherein the trolley and a structural part are illustrated by broken lines, and wherein the trolley is arranged in its first position.
Figure 3B:
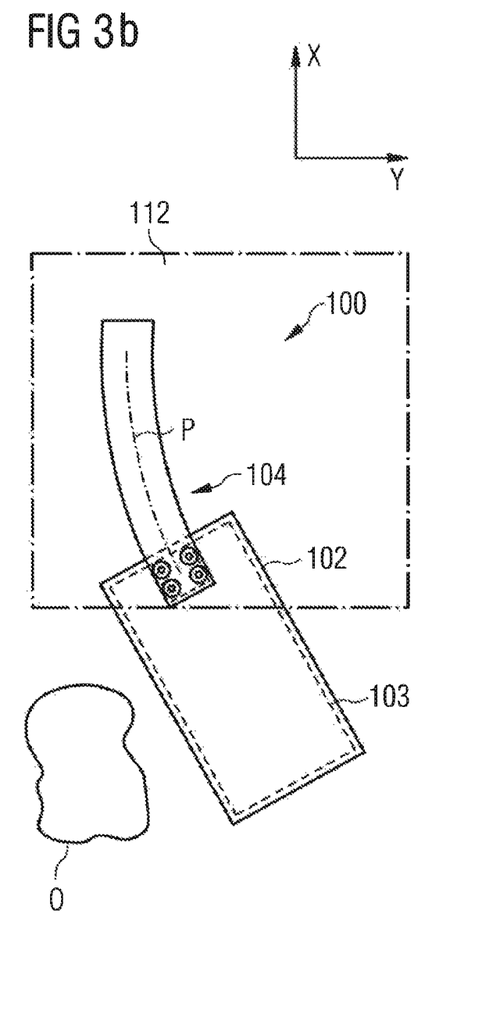
FIG. 3b shows a top view of the trolley handling device according to FIG. 2, wherein the trolley and the structural part are illustrated by broken lines, and wherein the trolley is arranged in its second position protruding from the trolley stowage.
Figure 4A:
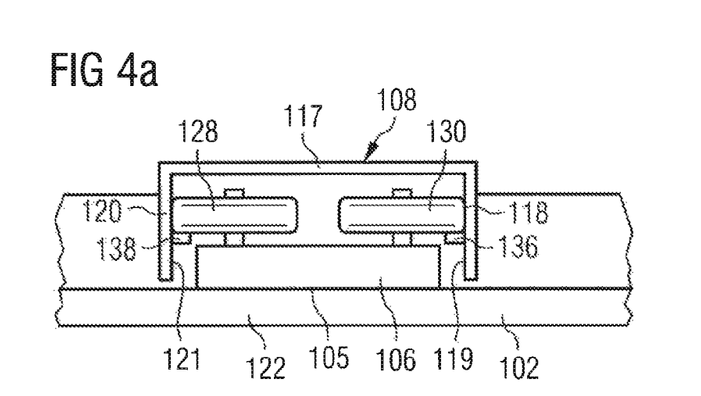
FIG. 4a shows a partial cross-sectional view of the trolley handling device according to FIG. 2, wherein the first guiding element is in engagement with the second guiding element.

FIGS. 2, 3a, 3b and 4a show a trolley handling device 100. The trolley handling device 100 comprises a trolley holder 102 and a guiding device 104 with a first guiding element in the form of a slide 106 as well as a second guiding element in the form of a guiding rail 108. The guiding rail 108 is shown in FIGS. 2, 3a, 3b and 4a attached to a structural part delimiting the trolley stowage 114, which structural part is a desk 112 of a trolley cabinet illustrated in FIGS. 3a and 3b by a broken line. The guiding rail 108 is U-shaped with a base part 117 connecting two parallel limbs 118, 120, and is attached to the desk 112 by its base part 117. Optionally, the guiding rail 108 may be arranged in a groove formed in the desk 112 and having essentially the same shape as the guiding rail, wherein the limbs 118, 120 project from said groove (as shown in FIG. 4a), providing an improved path of force transmission between the trolley holder 102 and the desk 112. The slide 106 is fixed to the trolley holder 102 proximate to an end 105 of the trolley holder facing the desk 112.

The slide 106 further comprises a plurality of rollers 124, 126, 128, 130 attached to the trolley holder such as to be able to rotate about an axis that is perpendicular to a basis 122 of the trolley holder, wherein, in FIG. 4a, only rollers 128 and 130 are shown. Retaining projections 136, 138 project from the limbs 118, 120 such as to hold the slide 106 in the guiding rail 108, thus, to counteract gravity. Moreover, the guiding rail 108 is closed at its longitudinal ends. When the slide engages with the guiding rail 108, the rollers 124, 126, 128, 130 are designed to contact the parallel limbs 118, 120 of the U-shaped guiding rail on their opposing inner surfaces 119, 121. Thus, when the trolley is moved such that the slide 106 engages with the guiding rail 108, the rollers 124, 126, 128, 130 are adapted to move along surfaces 119, 121 to lead the movement of the trolley from a first position in which the trolley 103 is arranged inside of a trolley stowage 114 (see FIGS. 2 and 3a) to a second position in which the trolley 103 is partially arranged outside of the trolley stowage 114 (see FIG. 3b) along a path P, and vice versa. Herein, the path P corresponds to the shape of the guiding rail 108, and extends between two ends corresponding to the first and second positions, respectively.

In the second position shown in FIG. 3b, the trolley 103 as well as the trolley holder 102 are offset relative to the first position shown in FIG. 3a in a first direction Y in which the trolley holder 102 secures the trolley 103 against displacement, and in a second direction X that is perpendicular to the first direction Y. The path has the shape of a circular arc having a preset radius of 2 meters, and extends in a plane formed by the first and second directions X, Y. Accordingly, the trolley is guided in a well-defined manner around and past an obstacle O to prevent a clash between the obstacle O and the trolley 103. Moreover, when the trolley holder 102 is arranged in its second position, its top surface forms a pull-out table for depositing goods, thus, functions as an extension for the desk 112.

As shown in FIG. 2, the trolley holder 102 has an essentially U-shaped cross-section in a plane that is perpendicular to the second direction X. Two parallel limbs 132, 134 of the trolley holder opposing each other extend in the X-direction, particularly when the trolley is in its first position arranged inside the trolley stowage shown in FIG. 3a. These limbs 132, 134 are connected by the basis 122 of the trolley holder 102, to which the slide 106 is essentially attached in a rigid manner Thereby, a relative movement, particularly a rotation, between the trolley holder 102 and a portion of the slide 106 facing the basis 122 of the trolley holder 102, is prevented.

The trolley holder 102 has a back wall 110 for limiting the movement of the trolley 103 in the second direction X. The back wall preferably extends between and substantially perpendicularly to the parallel limbs 132, 134, and is arranged at an end of the trolley holder 102 in the second direction X that is the furthest-most inside the trolley stowage 114 when the trolley 103 is in its first position shown in FIG. 3a. Moreover, a latch (not shown) is attached to the trolley holder 102 at a front end of the trolley holder opposing the back wall 110, which latch is adapted for securing the trolley 103 to the trolley holder 102. Thus, the trolley 103 is fixed to the trolley holder 102 between the back wall 110 and the latch.

Figure 4B:
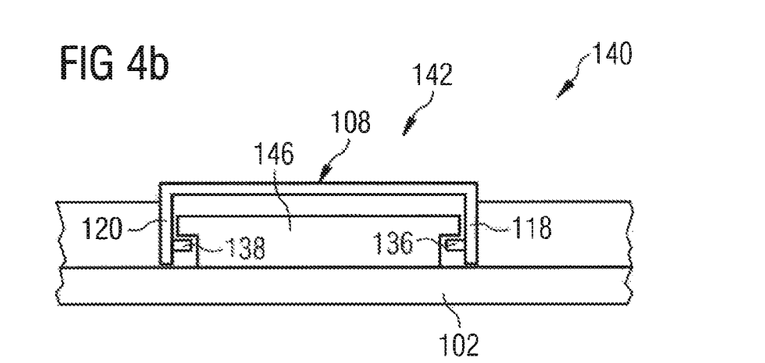
FIG. 4b shows a partial cross-sectional view of an alternative trolley handling device, wherein the first guiding element is in engagement with the second guiding element.

FIG. 4b illustrates an alternative trolley handling device 140 which differentiates from the trolley handling device 100 in that its guiding device 142 comprises a rollerless, essentially T-shaped slide 146 instead of the slide 106. In particular, the slide 146 is configured for gliding along the opposing limbs and the retaining projections 136, 138 of the guiding rail 108. A lubricant, not shown in the figures, is interposed between the slide and the inner surfaces 119, 121 of the guiding rail and the retaining projections. Alternatively, the gliding of the slide along these surfaces may be improved by coating the slide and/or the surfaces contacting the slide with a low-friction hard coating such as diamond-like carbon.

Otherwise, the structure and the function of the trolley handling device 140 correspond to the structure and the function of the trolley handling device 100.

Figure 4C:
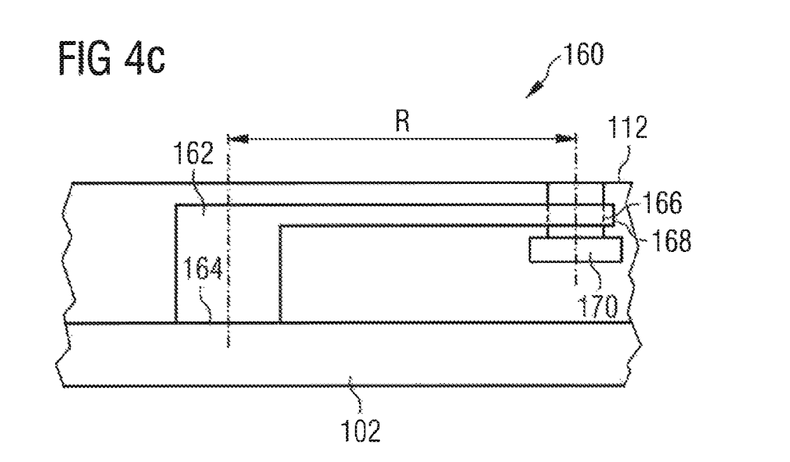
FIG. 4c shows a partial cross-sectional view of a further alternative trolley handling device, wherein the first guiding element is in engagement with the second guiding element.

In a further alternative, which is partially shown in FIG. 4c, a trolley handling device 160 comprises a pivoting arm 162, which represents a first guiding element. A first end 164 of the pivoting arm 162 is rigidly fixed to the trolley holder 102 such as to avoid a relative movement, particularly a rotation, between the first end 164 and the trolley holder 102. Furthermore, a bore 166 is formed in the pivoting arm 162 proximate to its second end 168. Through the bore 166, a bolt 170 extends, which is fixed to the desk 112 of the trolley cabinet 112. Thus, the bolt 170 suspends the pivoting arm to the desk of the trolley cabinet such that the pivoting arm 162 is pivotable about the bolt 170 along a circle having a radius R of 2 meters.

Otherwise, the structure and the function of the trolley handling device 160 according to FIG. 4c correspond to the structure and the function of the trolley handling device 100.

Figure 5:
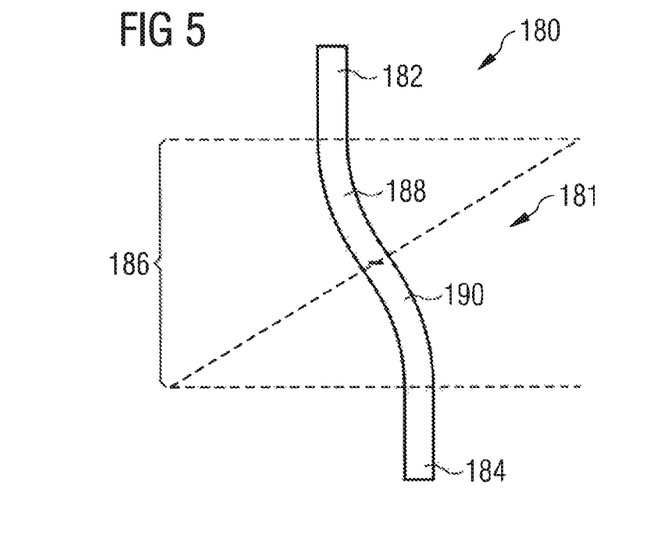
FIG. 5 shows a top view onto the second guiding element of a further alternative trolley handling device.

FIG. 5 shows a guiding-rail 181 forming part of a further alternative trolley handling device 180. This guiding rail 181 is essentially S-formed, and further comprises two straight portions 182, 184, one of which is arranged on either side of an S-shaped portion 186. Thus, further to a first arc portion 188 having the shape of a circular arc with a predefined radius (e.g., the 2 m radius R), the S-shaped portion 186 comprises a second arc portion 190 which is curved contrary to the first arc portion 188, i.e., in the opposite direction. Accordingly, the first and second straight portions 182, 184 that are adjacent to the opposing ends of the S-shaped portion 186 extend in parallel to each other. Otherwise, the structure and the function of the trolley handling device 180 correspond to the structure and the function of the trolley handling device 100.

Figure 6:
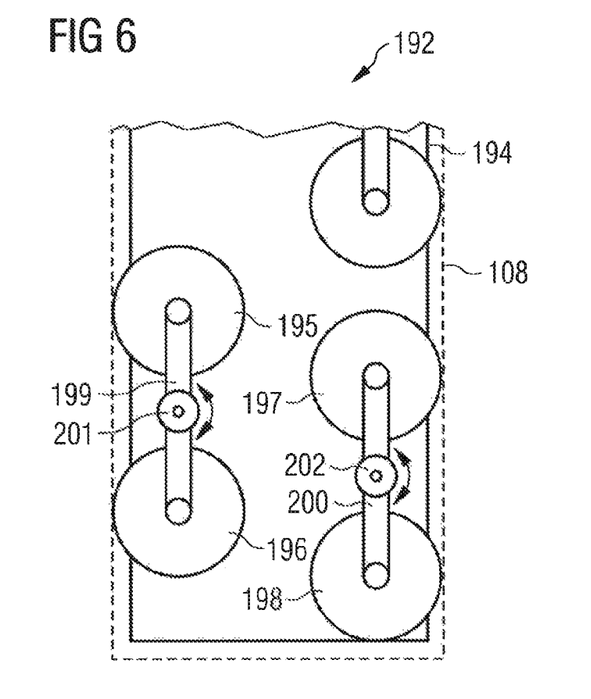
FIG. 6 shows a detailed partial view onto the first guiding element of a further alternative trolley handling device.

FIG. 6 shows a top view of a slide 194 of a further alternative trolley handling device 192. This slide 194 differs from the slide 106 in that its rollers 195, 196, 197, 198 are pair-wise rotatably suspended. In particular, each roller of a roller pair is rotatably attached to a common connecting part 199, 200, that is itself pivotably mounted to the slide by a pin 201, 202. Thus, the slide 194 is adapted to roll along the guiding rail by means of a plurality of pivotably suspended roller pairs. This configuration enables the slide to smoothly follow a curved guiding rail. Otherwise, the structure and the function of the trolley handling device 192 correspond to the structure and the function of the trolley handling device 100.

Figure 7:
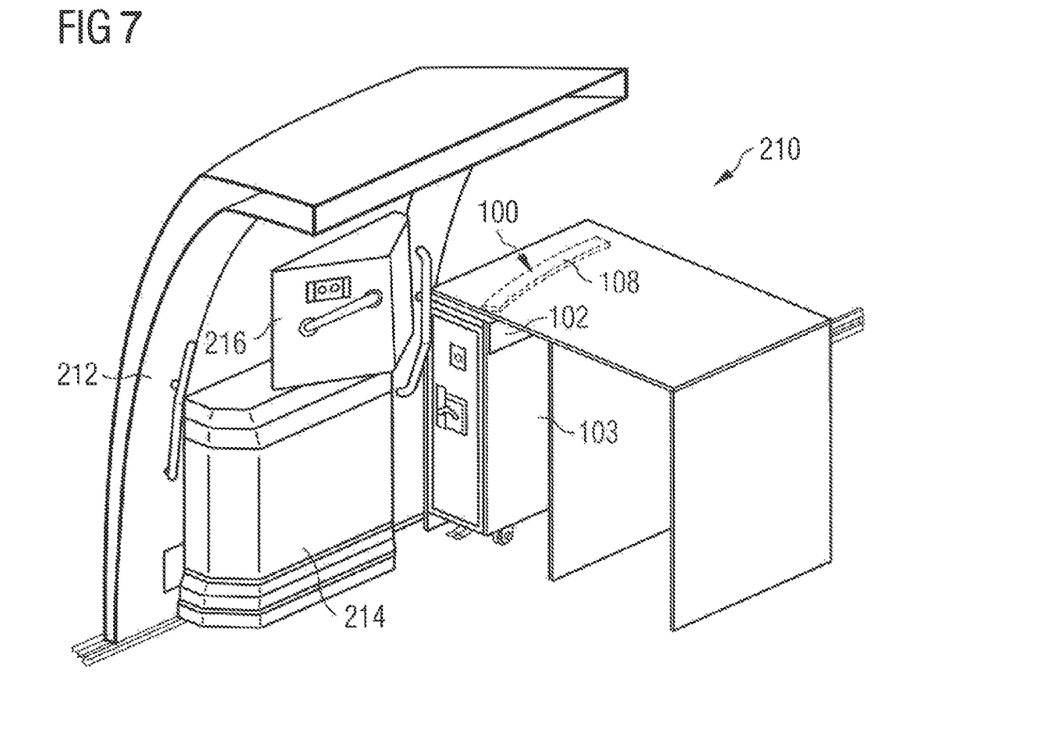
FIG. 7 shows a perspective view of a trolley cabinet, wherein a trolley is arranged in its first position.

Finally, FIG. 7 shows a perspective view of a trolley cabinet 210 located in the proximity of an aircraft entrance area next to an aircraft door 212, wherein the trolley 103 is arranged in its first position. The trolley cabinet 210 comprises the trolley handling device 100 described above in details, but may alternatively comprise at least one of the aforementioned alternative trolley handling devices. Optionally the guiding rail 108 may not be a separate part, but a groove (not shown) formed on the underside of the desk 112 of the trolley cabinet 210. A slide/raft box 214 and a door hinge 216 forming part of the aircraft door 212 each represent obstacles O. By the interaction between the trolley holder 102, the guiding rail 108 and the slide, the trolley is effectively guided around the slide/raft box 214 and door hinge 216. When the trolley holder 102 is in the second position (cf. FIG. 3b), the top surface 105 of the trolley holder 102 functions as a desk extension.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trolley handling device for guiding a trolley into and out of a trolley stowage, comprising
    a trolley holder adapted to interact with the trolley and secure the trolley against displacement relative to the trolley holder in at least a first direction, and
    a guiding device comprising a first guiding element attached to the trolley holder and a second guiding element adapted to be provided on a structural part arranged in the vicinity of the trolley stowage,
    wherein the first and second guiding elements are configured to engage with each other and configured so as to guide the trolley between a first position, in which the trolley is essentially arranged inside of the trolley stowage, and a second position, in which the trolley is at least partially arranged outside the trolley stowage,
    wherein the trolley, in its second position, is arranged offset relative to its first position in the first direction and in a second direction perpendicular to the first direction
    wherein the first and second directions are oriented horizontally, thus, form a horizontal plane.

2. The trolley handling device according to claim 1,
    wherein the trolley holder has an essentially U-shaped cross-section in a plane that is perpendicular to the first and second directions, and
wherein two parallel limbs of the trolley holder opposing each other extend in the second direction.

3. The trolley handling device according to claim 1, wherein the trolley holder is rigidly attached to the first guiding element such that a relative movement between the trolley holder and at least a part of the first guiding element is prevented.

4. The trolley handling device according to claim 1, wherein the first and second guiding elements are configured so as to guide the trolley along a preset path extending between the first and second positions in a plane defined by the first and second directions.

5. The trolley handling device according to claim 4, wherein the path comprises a first section formed as a first arc or as a line crossing the first and second directions.

6. The trolley handling device according to claim 4, wherein the path comprises a second section formed as a second arc that is bent in the opposite direction of the first arc.

7. The trolley handling device according to claim 1, wherein the first guiding element comprises a slide, and the second guiding element comprises a guiding rail designed to receive the slide, wherein the guiding rail is attachable to a surface of the structural part facing the trolley holder.

8. The trolley handling device according to claim 7, wherein the guiding rail has two essentially parallel walls extending perpendicularly to the first and the second directions,
    wherein the slide comprises a base part formed integrally with the trolley holder and a plurality of rollers that are rotatably mounted to the base part and arranged to rotate about an axis aligned perpendicularly to the first and second directions and to roll along the two walls of the guiding rail.

9. The trolley handling device according to claim 7, wherein the guiding rail has a U-shaped cross-section and the slide comprises a complementary rail portion configured for gliding along opposing surfaces of limbs of the guiding rail.

10. The trolley handling device according to claim 1, wherein a top surface of the trolley holder is configured to extend the desk.

11. A trolley cabinet comprising a trolley handling device according to claim 1.

12. The trolley cabinet according to claim 11,
    wherein the structural part is a desk of the trolley cabinet, wherein the second guiding element is attached to said desk, and
    wherein a top surface of the trolley holder is configured to extend the desk.

13. A transportation vehicle having at least one of a trolley handling device according to claim 1 and a trolley cabinet comprising such a trolley handling device.

14. A transportation vehicle according to claim 13 comprising an airplane.

15. A transportation vehicle according to claim 13 comprising a train.

16. A method of guiding a trolley into and out of a trolley stowage with a trolley handling device according to claim 1, the method comprising the steps:
    bringing the trolley into interaction with the trolley holder to secure the trolley against displacement relative to the trolley holder in at least the first direction, and
    guiding the trolley in a horizontal plane between the first position and the second position, displaced in two perpendicular directions in the horizontal plane by the trolley handling device.

17. A trolley handling device for guiding a trolley into and out of a trolley stowage, comprising
    a trolley holder adapted to interact with the trolley and secure the trolley against displacement relative to the trolley holder in at least a first direction, and
    a guiding device comprising a first guiding element attached to the trolley holder and a second guiding element adapted to be provided on a structural part arranged in the vicinity of the trolley stowage,
    wherein the first and second guiding elements are configured to engage with each other and configured so as to guide the trolley between a first position, in which the trolley is essentially arranged inside of the trolley stowage, and a second position, in which the trolley is at least partially arranged outside the trolley stowage,
    wherein the trolley, in its second position, is arranged offset relative to its first position in the first direction and in a second direction perpendicular to the first direction,
    wherein the first guiding element comprises a pivoting arm with a first end that is coupled to the trolley holder and a second end having an opening,
    wherein the second guiding element comprises a bolt that is suitable for suspending the pivoting arm to the structural part such that the pivoting arm is pivotable about the bolt when the bolt extends through the opening.

* * * * *